United States Patent [19]

Damm

[11] Patent Number: 5,740,758
[45] Date of Patent: Apr. 21, 1998

[54] DISPOSABLE BIRD FEEDER

[76] Inventor: Robert E. Damm, 4680 Woodhaven Dr., Galena, Ohio 43021-9607

[21] Appl. No.: 806,015

[22] Filed: Feb. 24, 1997

[51] Int. Cl.$^6$ .............................. A01K 1/10; A01K 5/00; A01K 39/00
[52] U.S. Cl. ........................................ 119/57.8; 119/57.9
[58] Field of Search ................................ 119/57.8, 57.9, 119/52.2, 52.3, 51.03

[56] References Cited

U.S. PATENT DOCUMENTS

| | | | |
|---|---|---|---|
| 3,399,650 | 9/1968 | Goodman | 119/57.9 X |
| 4,026,244 | 5/1977 | Salick | 119/57.8 |
| 5,165,363 | 11/1992 | McGinty | 119/57.8 X |
| 5,479,881 | 1/1996 | Lush et al. | 119/57.8 |

FOREIGN PATENT DOCUMENTS 2222928  3/1990  United Kingdom ................ 119/57.8

*Primary Examiner*—Nicholas D. Lucchesi
*Attorney, Agent, or Firm*—Norman B. Rainer

[57] ABSTRACT

A disposable bird feeder apparatus, particularly adapted for the feeding of finches, includes a container of elongated shape fabricated of porous sheet material. The container holds particulate bird feed material such as thistle seed. The size of the pores is slightly greater than the diameter of the seed, thereby facilitating controlled removal of the seed through the sheet material.

11 Claims, 1 Drawing Sheet

DISPOSABLE BIRD FEEDER

BACKGROUND OF THE INVENTION

1. Field of the Invention

This invention concerns bird feeding apparatus, and more particularly concerns disposable apparatus for the feeding of selected species of birds.

2. Description of the Prior Art

Numerous types of bird feeding devices have long been known for use by hobbyists or homeowners for the casual or opportunistic feeding of wild birds. In general, such devices include a container for confining a supply of seeds or other particulate material customarily eaten by birds, said seeds or other materials being generally referred to as "bird feed." The bird feed generally descends within the container by gravity effect toward apertures which controllably dispense the bird feed to the birds on a demand basis. Perching bars or equivalent means are usually positioned adjacent the apertures to enable the bird to stand while removing bird feed.

Many bird feeding devices are multi-component structures fabricated at some expense of metal, wood or plastic, yet having limited life expectancy because of outdoor weathering factors and wear caused by birds and squirrels.

The re-filling of such feeders by the bird fancier can be a time-consuming and messy chore. The conscientious bird fancier will, at the time of re-filling, spend additional time to carefully clean the feeder device to minimize the transmission of bird diseases. The hanging and un-hanging of the feeder can also involve precarious manipulation of the feeder to engage an overhead support.

It is desirable that the bird feed be protected against water accumulation, which would cause spoilage. This is usually accomplished by the provision of a roof structure in the feeder device. It is further desirable that structural features be avoided which would retain water in contact with the feed. It is also preferable that provision be made for the evaporation of water from damp feed. However, the transfer of moisture out of the feed-holding container is mechanistically inconsistent with the role of a container, namely prevention of loss of its contents.

U.S. Pat. No. 5,479,881 to Lush et. al. describes a semi rigid bag that feeds birds as well as squirrels or other wild game. U.S. Pat. No. 4,706,851 to Hegedus et. al. concerns a dispenser that hooks onto the bottom of a bag of feed, said dispenser having a perch and openings for emergence of the feed. U.S. Pat. No. 4,958,595 to Richmond et. al. describes a feeder with a pouch of bird feed, tray and side walls in a preferred apparatus that is purchased and discarded when the pouch is emptied. U.S. Pat. No. 4,233,941 to Webster concerns a feeder formed from a piece of bendable material which, when constructed, provides an enclosure for a plastic bag of bird feed, an opening for metering the feed, and a perch. U.S. Pat. No. 4,026,244 to Salick describes a plastic bag filled with bird feed, and utilizes pointed sticks that pierce the bag and thereby provide perches for the feeding birds.

Although the prior art addresses some of the desirable criteria concerning bird feeders, the provision of a feeder which incorporates most of the generally sought features has not yet been achieved, particularly for the selective feeding of small birds such as finches. When it is sought to selectively attract and feed finches amongst the variety of wild birds having access to a feeder, specialized feed material of small size is generally employed, particularly Niger Thistle. However, when dispensing feed material of such small size, it is very important to employ means for controlling the emergence of the feed to prevent wasteful loss of the feed by virtue of the feeding habits of the birds or other factors. In the feeding of finches, it is also desirable to provide means for cleaning the bird's beak for hygienic purposes.

It is accordingly an object of the present invention to provide a disposable bird feeder for selectively dispensing bird feed to small birds such as finches.

It is another object of this invention to provide a feeder as in the foregoing objective which minimizes the accumulation of water within said bird feed.

It is a further object of the present invention to provide a feeder of the aforesaid nature which provides controlled release of said bird feed.

It is a still further object of this invention to provide a feeder of the aforesaid nature which serves to clean the finch's bill as it feeds.

It is yet another object of the present invention to provide a feeder of the aforesaid nature of simple, sanitary construction amenable to low cost manufacture.

These objects and other objects and advantages of the invention will be apparent from the following description.

SUMMARY OF THE INVENTION

The above and other beneficial objects and advantages are accomplished in accordance with the present invention by a disposable bird feeder comprised of:

a) a container of generally elongated contour fabricated of porous sheet material and having sealed upper and lower extremities, the pores of said sheet material having a size between 0.055 and 0.065 inches, b) supporting means associated with at least one of said extremities, and c) particulate bird feed material of uniform particle size and elongated shape, the size of said particles, measured in at least one dimension being between 5% and 20% smaller than said pores, said bird feed substantially filling said container.

In preferred embodiments, the bird feed is naturally occurring seed material; thistle seed being particularly preferred. The seed is loaded into the container prior to the sealing thereof.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
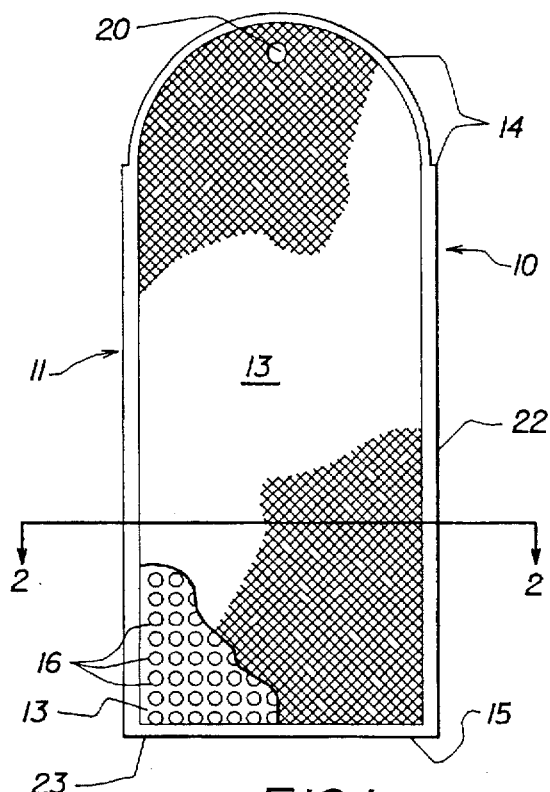
FIG. 1 is a front view of an embodiment of the bird feeder of the present invention with a fragmentary portion greatly enlarged.
Figure 2:
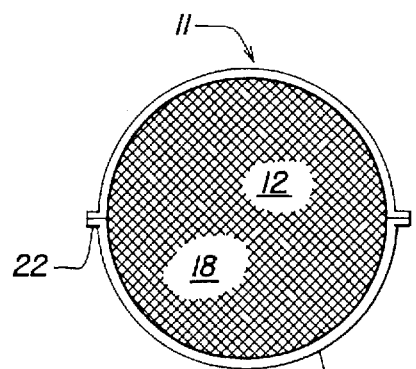
FIG. 2 is a sectional view taken in the direction of the arrows upon the line 2—2 of FIG. 1.
Figure 3:
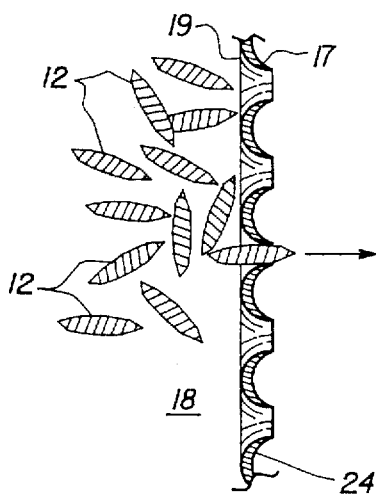
FIG. 3 is an enlarged fragmentary sectional side view of the feeder of FIG. 1.
Figure 4:
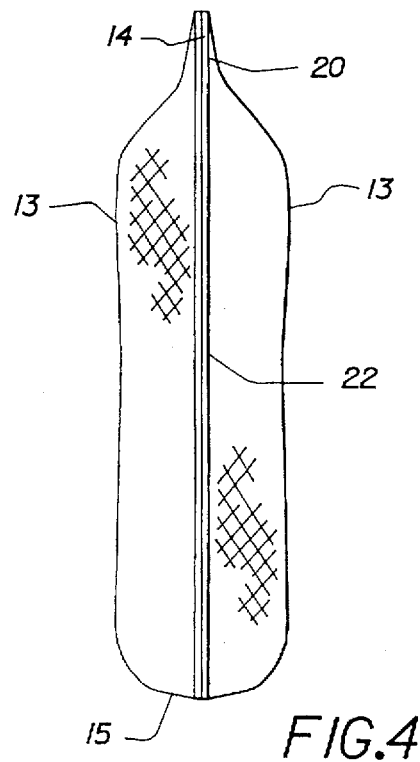
FIG. 4 is a side view of the embodiment of FIG. 1.

Referring now to FIGS. 1–5, an embodiment of the feeder 10 of the present invention is shown comprised of container 11 which confines thistle seed 12.

The container is of generally elongated shape, comprised of porous sidewall 13 and upper and lower extremities 14 and 15, respectively. Sidewall 13 is fabricated either from a piece of tubular sheet stock, or from a single piece of rectangular flat sheet stock which is folded and sealed at its meeting edge extremities, or from two pieces of rectangular flat sheet stock placed one atop another and interbonded at their opposed meeting edges. The bonding of edges of the sheet may be achieved by thermal, dielectric, or impulse methods, which produce longitudinal or transverse seams 22 and 23, respectively.

Figure 5:
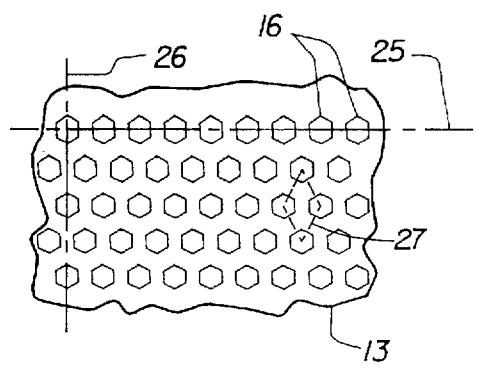
FIG. 5 is an enlarged fragmentary front view.

The sheet stock is preferably a film fabricated of a thermoplastic polymer such as polyethylene, and having a thickness in the range of 1.75 to 5 mils or 0.00175 to 0.005 inch. The pores or apertures 16 in the film may have a circular or non-circular configuration having a maximum dimension or diameter which is 5% to 20% larger than the smallest cross-sectional dimension of the seed. In the case of thistle seed, the smallest cross-sectional dimension, namely the diameter of the seed, is about 50 mils or 0.050 inch. Accordingly, the diameter of the apertures in a container employed for thistle seed is preferably between 55 and 65 mils. In certain embodiments, as shown in FIG. 5, the apertures may have a hexagonal shape. The frequency of occurrence of the apertures is such that there may be between about 80 and 120 pores or apertures per square inch of film. It is preferable that all the apertures in a given film be of identical size and shape.

The apertures are preferably uniformly spaced apart in horizontal rows 25 and vertical columns 26, as best shown in FIG. 5. In a particularly preferred pattern of rows and columns, the placement of the apertures in adjacent rows is staggered such that the centers of two adjacent apertures in a single row span the linear column locus. This causes two adjacent apertures in any given row, taken together with the adjacent apertures of the intervening column to be arranged in a diamond-shaped pattern represented by the broken line path denoted by numeral 27. The effect of such preferred diamond pattern is to permit closer spacing of apertures in the film.

The high frequency of occurrence of the apertures provides for: a) a proper statistically controlled emergence of the seed through the apertures, b) an adequate flow of ambient air which helps to remove moisture from the seeds, c) minimization of transport of rain water through the container and into the seed, and d) foot hold perching means for the finches.

The apertures may be formed in the film by several methods, including puncturing by sharpened needles. When the apertures are produced by said puncturing methods, a funnel-shaped region may exist around the aperture on that surface of the film which is opposite the surface initially contacted by the puncturing needle. In such instance, it is preferred to orient the film such that the funnel-shaped or neck region 24 is on the outer surface 17 of the container. Such manner of orientation assists the migration of seed from the interior 18 of the container to inner surface 19 of the sidewall for subsequent passage through the corresponding aperture.

By virtue of the aforesaid critical construction of the container, and the aperture configuration, the finch can remove only one seed at a time, thereby minimizing waste. In such manner of operation, the aperture serves a valve-like function for controlling the flow of seed outward from the container. Furthermore, because the size of the apertures is comparable to the thickness of a finch's bill, sidewall 13 serves to clean the bill.

Supporting means in the form of an aperture 20 may be disposed in the upper extremity of the container for pendently securing the feeder to an overhead support. Other supporting means include loops fabricated as a continuous integral extension of the film material of which the container is constructed, and loops of separately attached material.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

What is claimed is:

1. A disposable bird feeder comprised of:
   a) a container of generally vertically elongated contour fabricated of porous sheet material defining a sidewall having sealed upper and lower extremities and interior and outer surfaces, the pores of said sheet material being of uniform size and shape having a diameter between 0.055 and 0.065 inch,
   b) supporting means associated with said upper extremity, and
   c) particulate bird feed material of substantially uniform particle size and elongated shape, the size of said particles, measured in at least one dimension being between 5% and 20% smaller than the diameter of said pores, said bird feed substantially filling said container.

2. The bird feeder of claim 1 wherein said sheet material is a film fabricated of a thermoplastic polymer.

3. The bird feeder of claim 2 wherein said film has a thickness in the range of 1.75 to 5 mils.

4. The bird feeder of claim 3 wherein said film has between 80 and 120 pores per square inch.

5. The feeder of claim 4 wherein said pores are disposed in staggered rows and columns, and the centers of any four adjacent pores define a diamond-shaped locus.

6. The bird feeder of claim 2 wherein said film is of tubular configuration.

7. The bird feeder of claim 2 wherein said container is fabricated by the interbonding of two sheets of film along longitudinal and transverse seams.

8. The bird feeder of claim 2 wherein said container is fabricated by the folding of a single piece of rectangular film having longitudinal edges that meet upon folding, and interbonding said edges to produce longitudinal seams.

9. The bird feeder of claim 2 wherein said pores have a funnel-shaped cross-sectional contour having a narrow neck portion.

10. The bird feeder of claim 9 wherein said narrow neck portions of said pores are disposed upon the outer surface of said sidewall.

11. The bird feeder of claim 10 wherein said feed is thistle.

* * * * *